United States Patent
Huang

(10) Patent No.: US 10,009,679 B1
(45) Date of Patent: Jun. 26, 2018

(54) BLUETOOTH EARPHONE COMBINED WITH A PAIR OF EYEGLASSES

(71) Applicant: Wen-Tse Huang, Kaohsiung (TW)

(72) Inventor: Wen-Tse Huang, Kaohsiung (TW)

(*) Notice: Subject to any disclaimer, the term of this patent is extended or adjusted under 35 U.S.C. 154(b) by 0 days. days.

(21) Appl. No.: 15/860,703

(22) Filed: Jan. 3, 2018

(51) Int. Cl.
*H04R 1/10* (2006.01)
*G02C 11/00* (2006.01)
*H04R 1/02* (2006.01)

(52) U.S. Cl.
CPC .............. *H04R 1/105* (2013.01); *G02C 11/10* (2013.01); *H04R 1/028* (2013.01); *G02C 2200/18* (2013.01); *H04R 2420/07* (2013.01)

(58) Field of Classification Search
None
See application file for complete search history.

(56) References Cited

U.S. PATENT DOCUMENTS

| 8,011,783 B1* | 9/2011 | LeBlang | G02C 11/06 351/158 |
| 2008/0205683 A1* | 8/2008 | Weyer | H04R 1/1066 381/381 |
| 2010/0309426 A1* | 12/2010 | Howell | G02C 5/143 351/158 |
| 2013/0214998 A1* | 8/2013 | Andes | G02B 27/017 345/8 |
| 2017/0102560 A1* | 4/2017 | Murphy | H04R 25/608 |
| 2017/0251315 A1* | 8/2017 | Jannard | G02C 9/04 |
| 2018/0014105 A1* | 1/2018 | Abreu | G02C 3/003 |

* cited by examiner

*Primary Examiner* — Paul Huber
(74) *Attorney, Agent, or Firm* — Alan D. Kamrath; Kamrath IP Lawfirm, P.A.

(57) ABSTRACT

A Bluetooth earphone combined with a pair of eyeglasses includes an earphone body and an engaging member. The earphone body includes a recess in which two axle holes and ratchets are designed. The engaging member includes a coupling portion, a ratchet wheel provided at the bottom of the engaging member, and two shafts provided on the ratchet wheel. The shafts are engaged in the axle holes, and the ratchet wheel are coupled with the ratchets, such that the engaging member can rotate at a proper angle relative to the earphone body with the shafts as a center of rotation and can be sustained in an adequate angle. As such, the Bluetooth earphone is flexibly combined with a pair of eyeglasses owned by a user in usage.

3 Claims, 4 Drawing Sheets

BLUETOOTH EARPHONE COMBINED WITH A PAIR OF EYEGLASSES

BACKGROUND OF THE INVENTION

1. Field of the Invention

The present invention relates to a Bluetooth earphone installed on a pair of eyeglasses and, more particularly, to a detachable Bluetooth earphone combined with or removed from most temples.

2. Description of the Related Art

The innovative and advanced techniques make technical products more multifunctional and compact than ever and enable signal transfer from cable transmission to wireless transmission, for example, various digital products like mobile phones, mobile PCs, smart watches and Bluetooth earphones, all of which epitomize modern technologies.

In these digital products which are as wearable as clothes on a human body, the Bluetooth earphone hung on an ear is easily available to a user who is able to answer a phone call or listen to music by pressing down a function key once. However, an extra Bluetooth earphone hung on a user's ear on which a pair of eyeglasses has been worn already may discomfort the user and be fallen on the floor easily.

Available on the market, a pair of eyeglasses with which a Bluetooth earphone is integrated allows a user who wears eyeglasses to enjoy convenient functions of a Bluetooth earphone simultaneously. However, earphone speakers on the pair of eyeglasses are plugged into ear canals for a long time and discomfort the user, who needs not to use a Bluetooth earphone, instead.

Accordingly, an alternative Bluetooth earphone in structural design should be further considered for the convenient application of a Bluetooth earphone available to a user wearing eyeglasses.

BRIEF SUMMARY OF THE INVENTION

Thus, an objective of the present invention is to provide a Bluetooth earphone that can be combined with various eyeglasses easily and freely hung on or removed from temples for storage as practically required.

To achieve this and other objectives, a Bluetooth earphone combined with a pair of eyeglasses of the present invention includes an earphone body and an engaging member. The earphone body is provided with a recess including a bottom wall. Two opposite axle holes are provided in the recess, and a plurality of ratchets is formed at the bottom wall of the recess. The engaging member is adapted to be detachably combined with a temple of a pair of eyeglasses. The engaging member includes a coupling portion, a ratchet wheel and two shafts. The coupling portion has a clearance hole therein for engaging with the temple. The ratchet wheel is formed at a bottom end of the coupling portion and accommodated in the recess of the earphone body for coupling with the ratchets. The shafts are provided at the ratchet wheel and respectively engaged in the axle holes so that the engaging member can rotate at a proper angle relative to the earphone body with the shafts as a center of rotation. As such, the Bluetooth earphone of the present invention is easily combined with a temple of a pair of eyeglasses owned by a user without problems of discomfort due to a conventional Bluetooth earphone worn on the user and inflexibility of a pair of conventional integrated Bluetooth eyeglasses in usage.

In a preferred form, the earphone body includes a shell body consisting of two split shells. The shell body includes a top and a bottom, and the recess is provided in the top of the shell body and encircled by two opposite outer walls and the bottom wall. An opening is defined in the top end of the recess. Each of the two outer walls is provided at the top of one of the split shells, and the two axle hole are opened in the two outer walls, respectively.

In a preferred form, the coupling portion of the engaging member is made of elastic silicone, both the ratchet wheel and the shafts are made of strengthened plastics, and the engaging member is molded integrally in an injection overmolding process.

The present invention will become clearer in light of the following detailed description of an illustrative embodiment of this invention described in connection with the drawings.

DESCRIPTION OF THE DRAWINGS

The illustrative embodiment may best be described by reference to the accompanying drawings where.

DETAILED DESCRIPTION OF THE INVENTION

Figure 1:
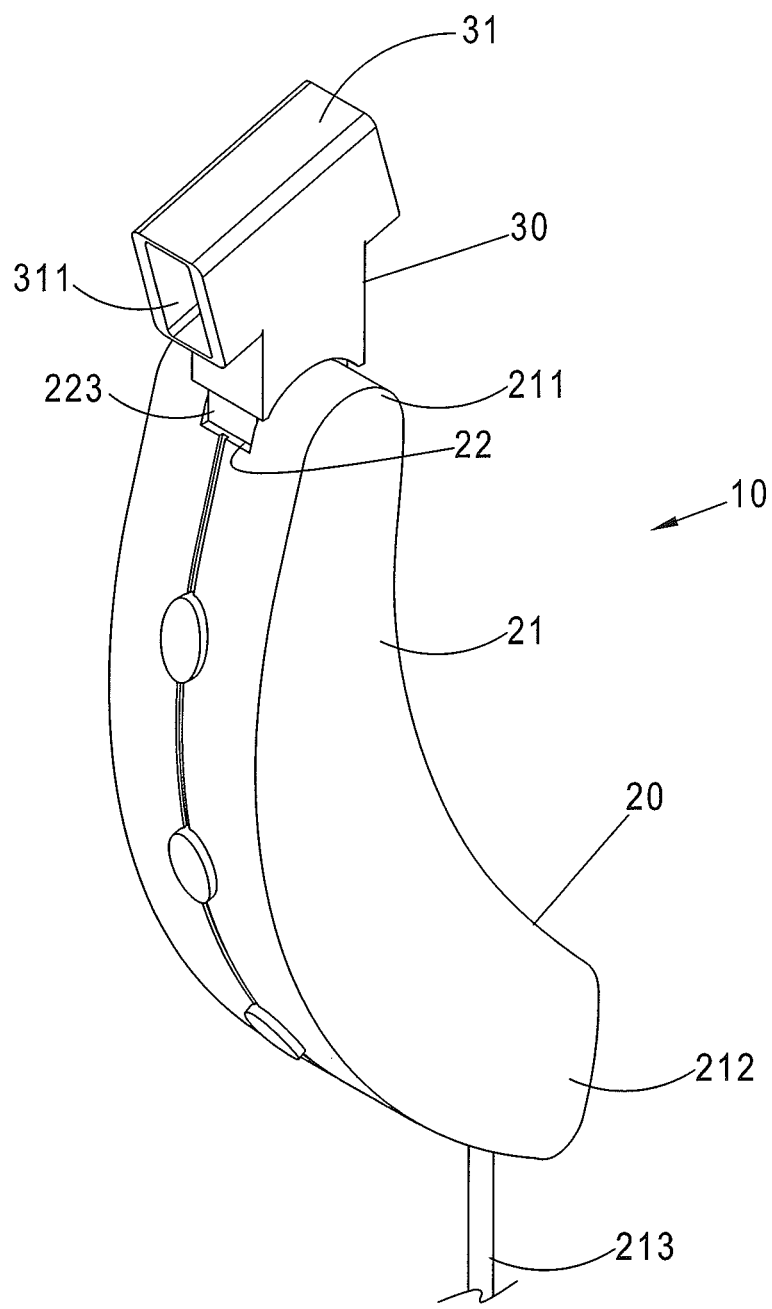
FIG. 1 is a perspective view of a Bluetooth earphone in an embodiment of the present invention.
Figure 2:
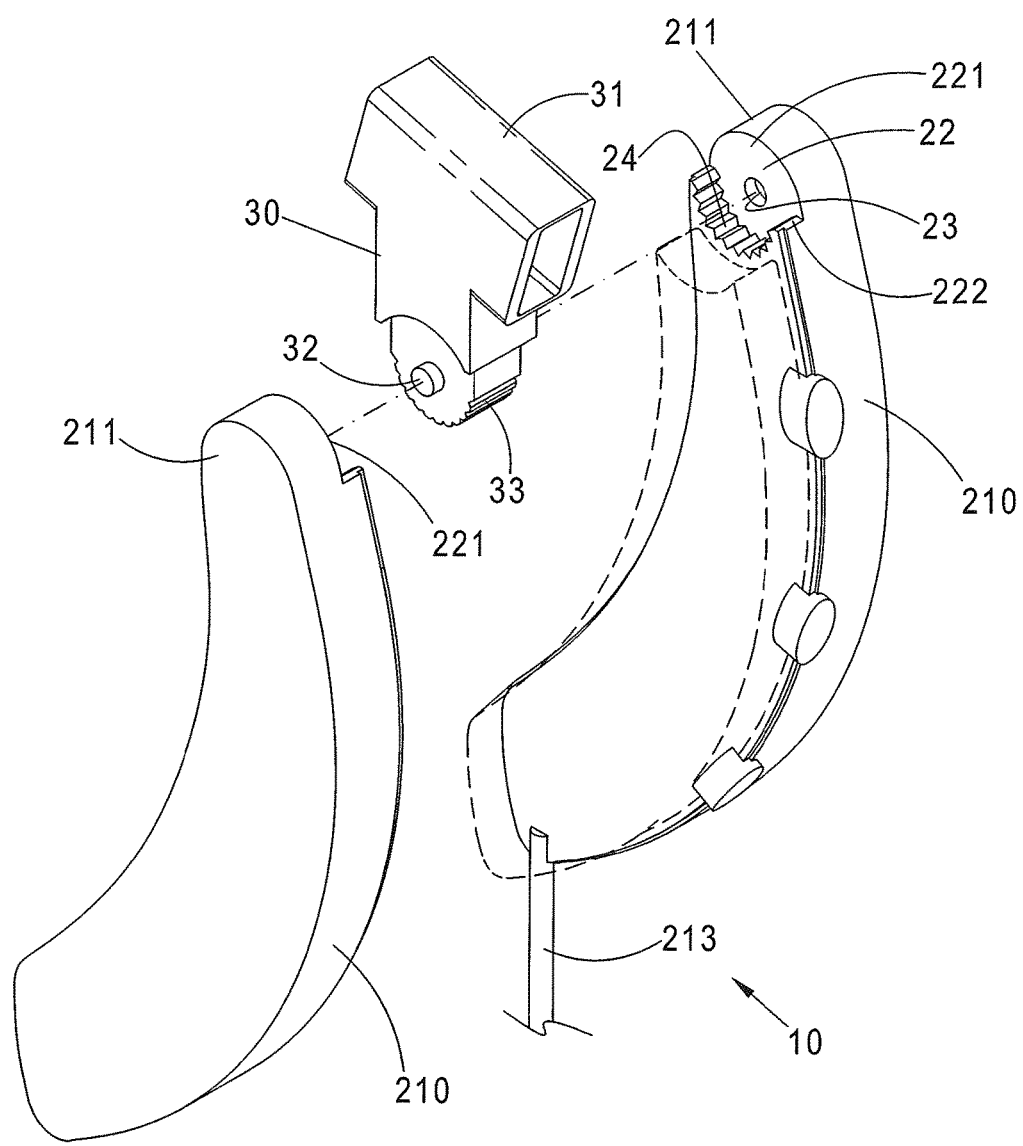
FIG. 2 is a schematic, exploded view of the Bluetooth earphone in FIG. 1.
Figure 3:
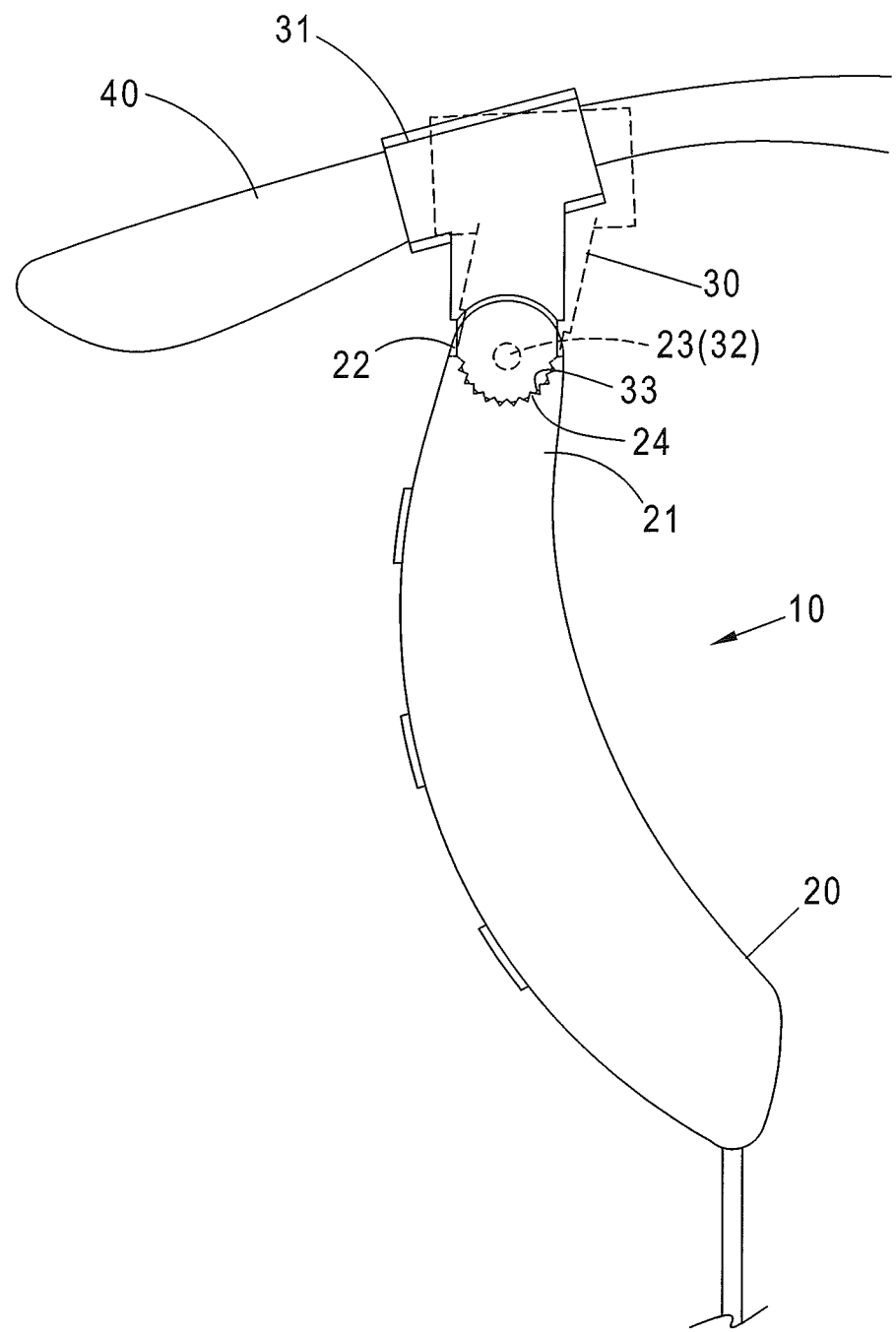
FIG. 3 is a schematic view for the Bluetooth earphone in FIG. 1 combined with a temple.

A Bluetooth earphone 10 combined with a pair of eyeglasses according to an embodiment of the present invention is shown in FIGS. 1 through 3 of the drawings and generally includes an earphone body 20 and an engaging member 30. The earphone body 20, which is an electronic component assembly with the Bluetooth earphone function, includes a shell body 21 with electronic components inside (not shown in figures). The shell body 21 includes a top 211 and a bottom 212 from which an audio cable 213 extends. In this embodiment, the shell body 21 consists of two split shells 210. A recess 22 is developed in the top 211 of the shell body 21 and encircled by two outer walls 221 opposite to each other as well as a bottom wall 222. An opening 223 is defined in a top end of the recess 22. Each outer wall 221 is located at the top 211 of one of the split shells 210, and the outer walls 221 are provided with two opposite axle hole 23 therein. The bottom wall 222 displaying an arc shape is provided with a plurality of ratchets 24 thereon.

The engaging member 30 includes a coupling portion 31, an arc-shaped ratchet wheel 33 provided at a bottom of the coupling portion 31, and two shafts 32. The coupling portion 31 has a clearance hole 311 inside in which a temple 40 of a pair of eyeglasses is engaged. The ratchet wheel 33 is accommodated in the recess 22 of the earphone body 20 and coupled with the ratchets 24. The shafts 32 are provided at two side walls of the ratchet wheel 33 and respectively engaged in the axle holes 23. As such, the engaging member 30 can rotate at a proper angle relative to the earphone body 20 with the shafts 32 as a center of rotation, and sustained at an adjustable angle according to interference resistance between the ratchets 24 and the ratchet wheel 33.

In an embodiment, the coupling portion 31 of the engaging member 30 is made of elastic silicone, and both the ratchet wheel 33 and the shafts 32 are made of strengthened plastics, such that the engaging member 30 is molded integrally in an injection over-molding process. As such, when a rear end of the temple 40 is accommodated in the coupling portion 31 (see FIG. 3), the whole Bluetooth earphone 10 which relies on elastic binding force of the coupling portion 31 can be stably combined with or flexibly removed from the temple 40.

The Bluetooth earphone 10 of the present invention is available to most users who are wearing eyeglasses and also requiring a Bluetooth earphone which is combined with a temple of a pair of eyeglasses but not hung on an ear for a long time. Accordingly, the problem common in a pair of conventional integrated Bluetooth eyeglasses worn on a user is settled.

Figure 4:
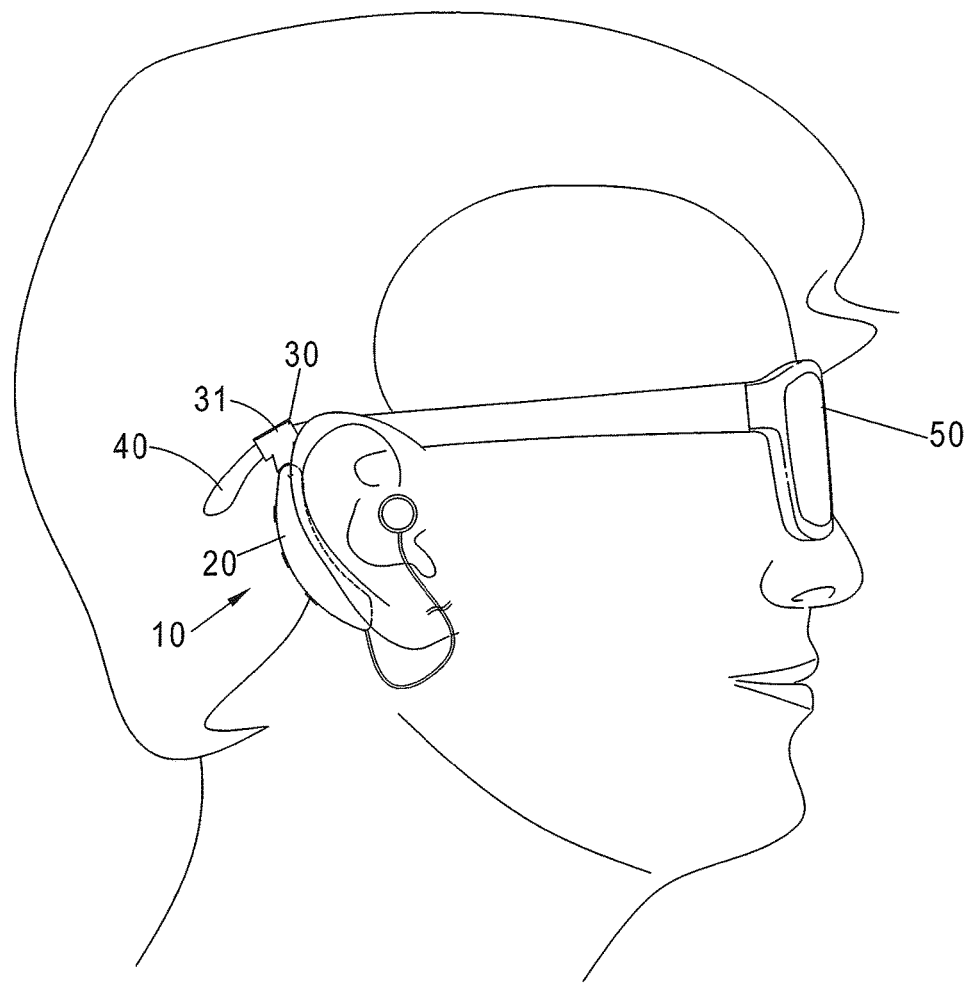
FIG. 4 is a schematic view illustrating a pair of eyeglasses with which the Bluetooth earphone in FIG. 1 is combined is worn on a user.

FIG. 4 illustrates the Bluetooth earphone 10 is combined with a pair of eyeglasses 50 worn on a user in practice, and the user feels comfortable at his/her ear on which the extra Bluetooth earphone is hung. Furthermore, as a convenient gadget in applications, the Bluetooth earphone 10 of the present invention can be easily removed from a pair of eyeglasses for storage but not fallen on the floor or lost.

The scope of the invention is to be indicated by the appended claims, rather than by the foregoing description, and all changes which come within the meaning and range of equivalency of the claims are intended to be embraced therein.

The invention claimed is:

1. A Bluetooth earphone combined with a pair of eyeglasses, comprising:
    an earphone body provided with a recess including a bottom wall, with two opposite axle holes provided in the recess, with a plurality of ratchets formed at the bottom wall of the recess; and
    an engaging member adapted to be detachably combined with a temple of a pair of eyeglasses, with the engaging member including a coupling portion, a ratchet wheel and two shafts, with the coupling portion having a clearance hole therein for engaging with the temple, with the ratchet wheel formed at a bottom end of the coupling portion, with the ratchet wheel accommodated in the recess of the earphone body and coupled with the ratchets, with the two shafts provided at the ratchet wheel and respectively engaged in the axle holes so that the engaging member can rotate at an angle relative to the earphone body with the two shafts as a center of rotation.

2. The Bluetooth earphone according to claim 1, wherein the earphone body includes a shell body consisting of two split shells, with the shell body including a top and a bottom, with the recess provided in the top of the shell body and encircled by two opposite outer walls and the bottom wall, with an opening defined in a top end of the recess, with each of the two outer walls provided at the top of one of the two split shells, with the two axle hole opened in the two outer walls, respectively.

3. The Bluetooth earphone according to claim 1, wherein the coupling portion of the engaging member is made of elastic silicone, both the ratchet wheel and the shafts are made of strengthened plastics, and the engaging member is molded integrally in an injection over-molding process.

* * * * *